Patented Sept. 5, 1944

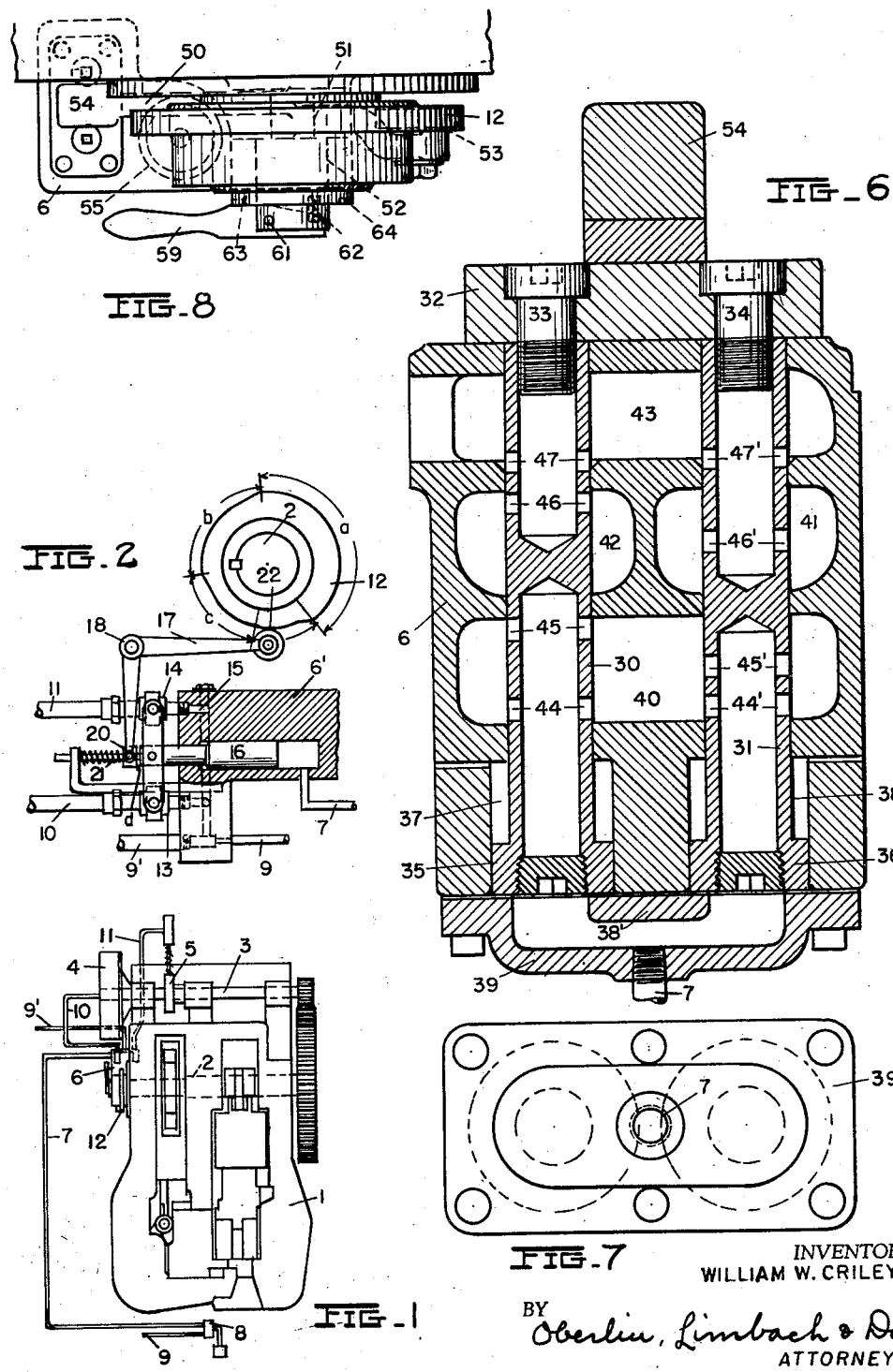

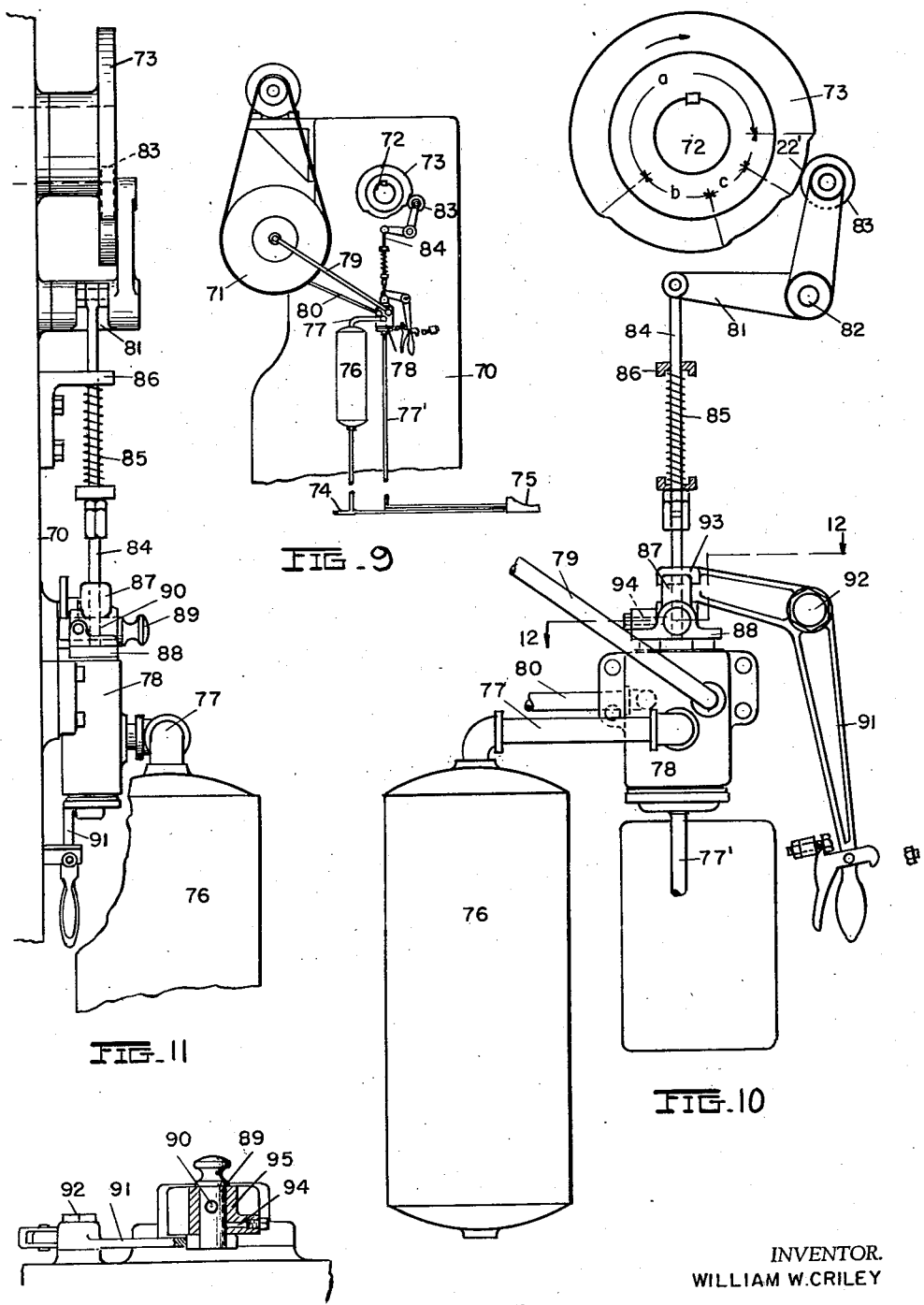

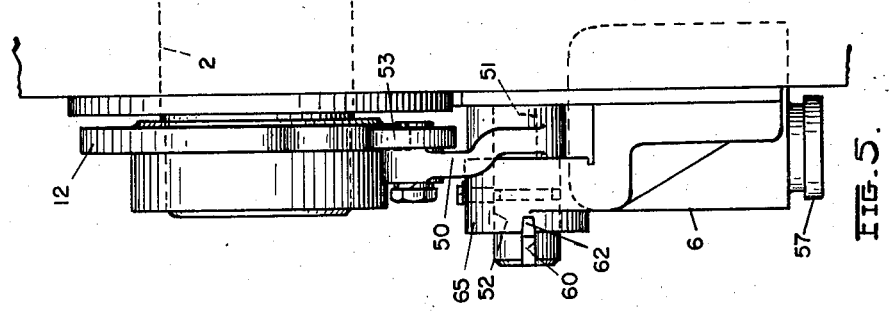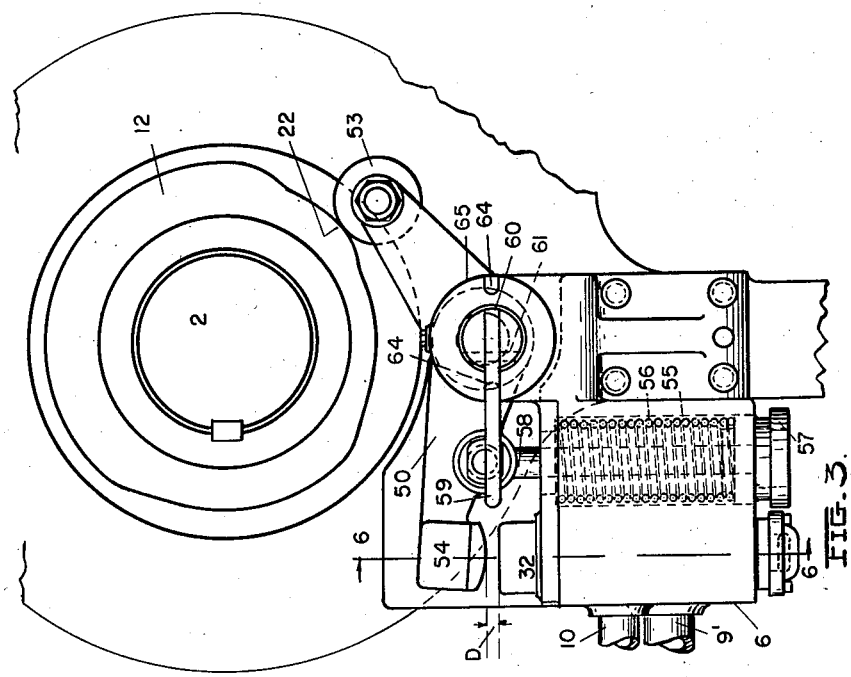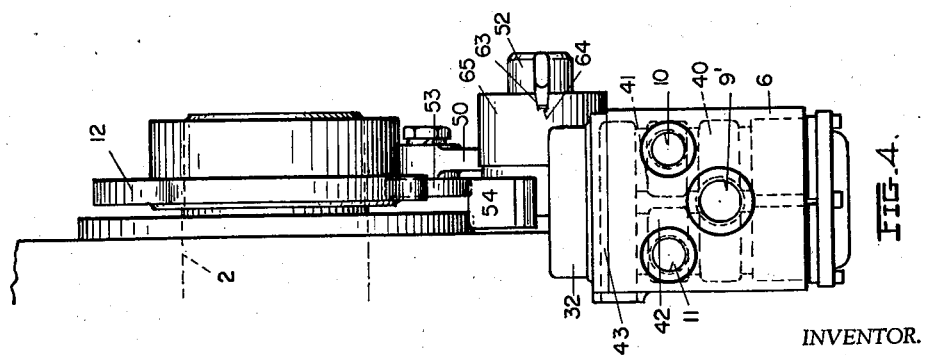

2,357,779

UNITED STATES PATENT OFFICE 2,357,779

CONTROL MECHANISM

William W. Criley, Shaker Heights, Ohio

Application April 24, 1941, Serial No. 390,092

10 Claims. (Cl. 192—144)

The present invention relates to a control mechanism for operating the application of prime moving power to metal working machines, such as forging machines, presses and the like. This invention constitutes an improvement upon the one embodied in my prior Patent No. 2,217,332, granted October 8, 1940. Such patent, by way of brief reference, related to a control mechanism comprising dual valves, each connected to the clutch and brake of the metal working machine, respectively, with unitary or single, manually actuated means for initiating the cycle of operation of the machine and automatic, machine-actuated means for controlling the operation of the machine during the remainder of the cycle.

One of the objects of the present invention is to simplify the structure disclosed in my above-mentioned prior patent and to provide means for operating the dual brake and clutch control valves in such a manner as to insure freedom from interference, or "overlapping" of the braking and clutching actions.

A further object of my invention is to provide means for effecting "repeat" operation of the machine, if desired, without involving the release and reengagement of the clutch at the end of one stroke and at the initiation of a repeat stroke, even though the manual control valve is held in constantly open or actuating position.

In my prior Patent No. 2,217,332, I have disclosed that it is desirable to release the brake and apply the clutch in sequence so that their actions will not be in opposition to each other. According to one of the principles and objectives of the present invention, I have found that this sequential action of brake release and clutch application can be substantially improved, resulting in the increased operating efficiency of the machine, by a sudden or relatively fast releasing action of the brake and a retarded engagement of the clutch, to assure that the brake is fully released before the clutch engages.

A further object of the invention is to provide means for optionally and conveniently disconnecting the automatic, machine-actuated control means, leaving the control mechanism subject to manual control operation solely. The accomplishment of this latter objective is particularly desirable for so-called "inching" operation of the machine wherein the parts are to be moved a very small distance at a time, such as in the setting and adjustment of dies.

Additional objects and advantages of the invention shall become apparent as the following description proceeds.

To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is an elevational view of a forging machine illustrating the control mechanism of the present invention as assembled thereon; Fig. 2 is a detailed view, partially in section, of a dual valve and machine-actuated control mechanism therefor, of a construction similar to that shown in my prior Patent No. 2,217,332, but with the improved and simplified construction of my present invention applied thereto; Fig. 3 is an elevational, detailed view of a modified form of the dual valve control mechanism embodying the present invention; Fig. 4 is an elevational view of the device of Fig. 3 viewed from the lefthand side; Fig. 5 is an elevational view of the device of Fig. 3 viewed from the righthand side; Fig. 6 is an enlarged, cross-sectional view of the dual valve chamber construction and taken substantially along the line 6—6 of Fig. 3; Fig. 7 is a bottom plan view of Fig. 6; Fig. 8 is a top plan view of Fig. 3; Fig. 9 is an elevational view showing another modified form of the control mechanism embodying my present invention as applied to a metal working press; Fig. 10 is an enlarged, detailed view of the control mechanism shown in Fig. 9; Fig. 11 is an elevational view taken from the lefthand side of Fig. 10; and Fig. 12 is a detailed, sectional view taken substantially along the line 12—12 of Fig. 10.

Now referring particularly to Fig. 1 of the drawings, there is shown therein a forging machine having a base 1 with a main shaft 2 and a high speed or back shaft 3. A fluid-actuated clutch 4 and a brake 5 are mounted upon the back shaft 3. It is, of course, apparent to those skilled in the art that these clutch and brake elements can be optionally mounted on the main shaft 2. Dual operating valves 6 for controlling the flow of fluid pressure for the operation of the clutch 4 and brake 5 is mounted upon the side of the frame 1 of the machine. A fluid pressure line 7 leads to the dual control valves from the manually operated valve or foot treadle 8 which, in turn, is connected to the main fluid pressure supply source by the line 9. Another line 9' also leads from the pressure supply source to the dual valve 6. A line 10 connects the dual valve 6 to the clutch 4 and the line 11 connects it to the pressure-actuated cylinder of the brake 5. A cam 12 is carried by the end of the main shaft 2 and is connected through the follower mechanism to the dual control valve 6.

In Fig. 2, the principle of my invention is shown as being applied as an improvement upon the dual valve control mechanism disclosed in my prior Patent No. 2,217,332, and wherein a dual valve body is indicated generally at 6'. The individual valves shown in Fig. 2 are of the sliding sleeve type and comprise the valve 13 connected to the line 10, leading to the clutch and the valve 14, connected to the line 11, leading to the brake. The line 9' is directly connected through the transverse passage through the valve body 6' to each one of the valves 13 and 14. The movement of the valves 13 and 14 in a lefthand direction, corresponding to their opening movement, is effected by their interconnection with the yoke or cross-bar 15 which, in turn, is connected to the rod of the piston 16 in the cylinder in the body 6'. The line 7, of course, leads to the manually driven valve or foot treadle which is also connected to the line 9, and introduces pressure into the cylinder in which the piston 16 operates to move the latter in a lefthand direction. A bell crank lever 17 is mounted upon the normally fixed pivot 18 and carries a cam following roller 19 at one end which is adapted to contact with the cam 12. The bell crank lever 17 is connected at its other end to the collar 20 slidably connected upon the rod of the piston 16. The coil spring 21 urges the collar 20 in a righthand direction.

The operation of the above described control mechanism of Fig. 2 is as follows: To initiate the stroke or cycle of operation of the machine, fluid pressure is introduced from the line 7 (by manipulation of the foot treadle 8) to force the piston 16 in a lefthand direction and to open the valves 13 and 14 in sequence, thus releasing the brake and applying the clutch. The cam 12 then rotates in the direction of the arrow, whereupon the roller 19 rides up upon the high arc a of the cam, rotating the bell crank lever 17 in a clockwise direction and holding the collar 20 against the pressure of the spring 21 and permitting the valves 13 and 14 to remain in open position, even after pressure is no longer applied in the line 7. As the cam roller 19 contacts with the lower arc b on the cam 12, the bell crank lever 17 partially rotates in a counterclockwise direction, a sufficient distance to close the valve 13, discontinuing pressure to the line 10 and thus releasing the clutch 4. As the cam follower 19 contacts with the still lower arc c on the cam 12, the valve 14 is correspondingly moved to closed position to apply the brake, bringing the shafts 3 and 2 and the moving parts of the machine to a stop. At the end of the arc c on the cam 12, there is a small rise or hump 22, which corresponds to the point at which the machine stops. The cam follower 19, at this point, rides up upon the small rise 22, rotating the bell crank lever 17 in a clockwise direction and moving the collar 20 a partial distance in a lefthand direction away from the valve connecting bar 15. This partial distance is represented at d in Fig. 2 and corresponds to the distance of movement of the valve 14 necessary for the opening thereof and the release of the brake 5. Thus, when another stroke of the machine is initiated by the application of pressure to the line 7, the valves 13 and 14 will be enabled to move the distance d without overcoming the resistance of the pressure of the spring 21. This initial movement will correspondingly be comparatively rapid and will thus operate to effect a prompt release of the brake 5. However, on further lefthand movement of the valves 13 and 14, their connecting bar 15 will contact with the collar 20 and such movement will be resisted by the pressure of the spring 21 and will be restrained from moving further until sufficient additional air pressure is built up in cylinder of piston 16 to overcome the spring pressure. This results in a definite pause in the lefthand or opening movement of the valves 13 and 14. This pause is so located as to occur at a point corresponding to the interval between the release of the brake and the engagement of the clutch.

It will thus be seen that the above described control mechanism and its mode of operation effects a relatively prompt and rapid release of the brake upon initiation of the cycle of operation with a sequential engagement of the clutch, but with a definite interval or pause between the two which is sufficient to insure the full release of the brake before engagement of the clutch.

In Figs. 3 to 8, inclusive, there is shown a modified form of construction of the dual valve control mechanism, wherein the modification consists essentially in changing the valve structure from the sliding sleeve type to the sliding piston type and with the return spring mounted in lateral, rather than longitudinal, alignment with the valve body. This modification also incorporates means for rendering the automatic, machine-actuated control inoperative for during such periods of operation as when the machine is subjected entirely to manual control, such as for "inching" purposes.

The illustration of the details of the interior structure in the valve body 6 has been somewhat simplified for convenience in illustration, with elements such as piston packings and valve packings being omitted and multi-part members being simplified to appear as being composed of single parts.

The valve body 6 encloses the sliding, hollow pistons 30 and 31, which are secured at their upper ends to the yoke plate 32 by means of the cap screws 33 and 34, respectively. The lower ends of the pistons 30 and 31 each have the enlarged head portions 35 and 36 making a close sliding fit in the cylinders 37 and 38, respectively, in the valve body 6. A cover plate 39 closes the lower end of the valve body 6 and contains the manifold passage 38' leading from the pressure line 7 to the cylinders 37 and 38.

The pressure supply line 9' connects through the wall of the valve body 6 to the intake pressure chamber 40. The clutch pressure line 10 connects to the chamber 41. The brake pressure line connects to the chamber 42. The chambers 41 and 42 are, of course, independent from each other. The chamber 43 is an exhaust manifold chamber for fluid pressure which is relieved from the chambers 41 and 42 and the lines or conduits correspondingly connected thereto.

Transfer ports 44 and 45 are located in the wall of the piston 30 and are adapted to place the chamber 40 in communication with the chamber 42 when the piston 30 is moved in an upward direction. Similar transfer ports 46 and 47 place the chamber 42 in communication with the exhaust chamber 43 when the piston 30 is in its lowermost position, as shown in Fig. 6. Similar transfer ports 44' and 45' are adapted to effect communication, on upward movement of the piston 31, between the chambers 40 and 41. However, it will be seen that the transfer port 45' is located closer to the bottom end of the piston 31 than the corresponding position of the port 45. This is for the purpose of effecting a later communication of the chamber 40 with the chamber 41 as the two pistons 30 and 31 move upwards in unison. The transfer ports 46' and 47' are adapted to place the chamber 41 in communication with the exhaust manifold 43. These latter ports are so located with respect to the length of the piston 31 as to place the chamber 41 in earlier communication with the exhaust manifold 43 than the chamber 42 during the downward movement of the pistons 30 and 31.

A bell crank lever 50 is pivotally mounted upon the reduced diameter, eccentric portion 51 of the stub shaft 52. A roller 53 is carried on one end of the bell crank lever 50 and is adapted to follow the contour of the cam 12 on the main shaft 2. The other end 54 of the lever 50 is adapted to contact with the yoke plate 32.

A coil compression spring 55 is mounted in an enclosing housing 56 alongside the valve body 6. The lower end of the spring 56 bears against the flanged nut 57, which threadably engages the connecting rod 58, which is pivotally connected at its upper end to the bell crank lever 50.

The lever 59 fits within the slot 60 in the end of the stub shaft 52 and is pivotally mounted by means of the pin 61. A pressure spring 62 mounted between the bottom of the slot 60 and the end of the lever 59 urges the latter in a clockwise direction (with respect to Fig. 8) so that its laterally projecting end is pressed inwardly. The lever 59 carries a small lug or tooth 63 which is adapted to engage in either one of two slots 64, located 180° apart in a horizontal plane on the radial face of the shaft bearing housing 65.

The operation of the above-described structure should now be quite apparent, since it is analogous to that previously described in connection with the form of construction of Fig. 2. Briefly, fluid pressure from the line 7, admitted through actuation of the foot treadle 8 moves the pistons 30 and 31 in an upward direction, placing the intake pressure chamber 40 in communication with the brake line chamber 42 and clutch line chamber 41 in the named sequence. Since the end 54 of the bell crank lever 50 is moved away from the yoke plate 32, a distance D, due to the disposition of the roller 53 upon the hump or rise 22 on the cam 12, the initial movement of the pistons 30 and 31 will be relatively free and unimpeded. This distance D corresponds to the distance which the piston 30 must travel in order to place the chamber 40 in communication with the chamber 42 and thus promptly to introduce pressure to the line 11 to release the brake 5. Further upward movement of the pistons 30 and 31, however, corresponding to the introduction of pressure to the line 10, to actuate the clutch 4, is resisted by the pressure of the spring 55 until sufficient pressure has been built up behind the piston so that the clutch engagement will be retarded, giving the brake ample time to release.

The cam 12, as utilized in the form of construction of Figs. 3 to 8, inclusive, is, of course, of similar contour as the same numbered cam described in connection with Fig. 2 and hence, the automatic, spring-actuated, machine-controlled operation of the brake and clutch during a stroke of the machine are likewise the same.

When it is desired to disconnect the machine-actuated control, the pivot point of the bell crank arm 50 is so moved that its cam following roller 53 will not contact with the periphery of the cam 12. This is accomplished by rotating the lever 59 through 180° from the position shown in Fig. 3 and locking it into such position by allowing its lug 63 to enter the right hand slot 64. Such rotation, of course, rotates the eccentric portion 51 of the shaft also through 180° and to a position whence its center line is vertically lowered twice the distance of the eccentricity of the shaft portion 51. The dotted lines in Fig. 3 illustrate this shifted position of the bell crank lever 50 wherein it will be seen that the roller 53 is out of contact with the cam 12, while, at the same time, the end 54 is in contact with the yoke plate 32. So that the pressure of the spring 55 is at all times exerted to force the pistons 30 and 31 in a downward direction. Thus, when pressure is released from the line 7, the pistons 30 and 31 will be immediately and fully returned to their lowermost positions by the pressure of the spring 55.

In the form of construction shown in Figs. 9 to 12, inclusive, a modified form of control mechanism embodying the principle of my invention is shown applied to a vertical press. In Fig. 9 there is shown the press frame 70, with the fluid-actuated clutch 71 mounted on the high speed drive shaft, which is suitably connected to the low speed, main shaft 72. A cam 73 is mounted on the end of the shaft 72 and has the same number of rises and depressions as the previously described cam 12, viz.: the high portion a' corresponding to the release of the brake and the engagement of the clutch, the intermediate portion b' corresponding to the release of the clutch only, the lowermost portion c' corresponding to the release of the clutch and the setting of the brake and finally, the intermediate rise 22' corresponding to the release of the brake alone.

The main pressure supply line 74 branches to the foot treadle 75 and to the accumulator tank 76 which, in turn, is connected to the line 77 to the dual valve housing 78. The line 77' connects the foot treadle 75 to the valve body 78. The interior construction and operation of the valve 78 is similar to that of the previously described valve 6. The line 79 leads from the valve 78 to the fluid-actuated clutch 71 and the line 80 leads to the brake (not shown).

A bell crank arm 81 is pivotally mounted to the fixed pivot 82 and has a cam following roller 83 on the end of one arm. The other end of the bell crank lever 81 is connected to the push rod 84 which is spring-loaded in a downward direction by means of the coil compression spring 85 mounted against the bracket 86 on the frame 70 of the press. The lower end of the push rod 84 fits in a socket 87 which is carried by the plate 88 to which the upper ends of the sliding pistons of the valve 78 are attached. A sliding latch pin 89 is mounted immediately below the socket 87 and has a transverse opening or hole 90 which is adapted to receive the end of the push rod 84 when the pin 89 is in its innermost position, as shown in Fig. 11. A hand lever 91 pivotally mounted at 92 has a slotted opening 93 which is adapted to receive the innermost end of the pin 89. The spring-loaded pin 94 extends through the wall of the casting carrying the pin 89 and its inner end is adapted to engage in a longitudinal slot 95 with detent pockets or recesses at either end thereof to prevent rotation of the pin 89 and to detain it in alternative positions wherein the hole 90 is either in, or out of, alignment with the end of the push rod 84.

The normal operation of the mechanism shown and described in connection with Figs. 9 to 12 is not deemed here necessary of explanation because it follows that previously described. When it is desired to disconnect the machine-actuated control mechanism from the dual control valve 78, the pin 89 is moved inward to the position shown in Fig. 11 wherein the end of the push rod 84 will ride freely back and forth in the slot 90 without effecting any movement of the valve piston connecting plate 88. Manual movement of the plate 88 and its connected pistons in the valve body 78, however, is accomplished by manipulation of the hand lever 71 which has become connected to the plate 88 by the entry of the inner end of the pin 89 in the opening 93 of the hand lever. The movement of the hand lever 91 is effective to move the pistons in the valve body 78 in both directions, viz., upwardly and downwardly, to effect release and engagement of the clutch and brake, as the operator may desire.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. A control mechanism for a machine having a fluid-actuated clutch and brake in its driving train with dual valve means for operating the clutch and brake actuating elements, comprising manually-actuated fluid power means for moving said valve means in opening direction, yieldable means urging said valve means in closing direction, and machine-actuated mechanical means for controlling the movement of said yieldable means, and for rendering inoperative the application of the urging force of said yieldable means to said valve means at the end of each cycle of operation of said machine thereby rendering free the initial movement of said fluid power means and of said valve means a portion of the distance in opening direction.

2. A control mechanism for a machine having a fluid-actuated clutch and brake in its driving train with dual valve means for operating the clutch and brake actuating elements, comprising manually-actuated fluid power means for moving said valve means in opening direction, yieldable means urging it in closing direction, and a machine-operated cam and follower adapted to control the action of said yieldable means in moving said valve means in said closing direction.

3. A control mechanism for a machine having a fluid-actuated clutch and brake in its driving train with dual valve means for operating the clutch and brake actuating elements, comprising manually-actuated fluid power means for moving said valve means in opening direction, spring means for moving said valve means in closing direction, a machine-operated cam and follower, one end of said follower being connected to said spring means, and adapted to contact said valve means and a portion of said cam being contoured to move said follower out of contact with said valve means at the end of each cycle of operation of said machine.

4. A control mechanism for a machine having a fluid-actuated clutch and brake in its driving train with dual valve means for operating the clutch and brake actuating elements, comprising manually-actuated fluid power means for moving said valve means in opening direction, spring means for urging said valve means in closing direction, machine-actuated mechanical means for controlling the movement of said spring means and for rendering the latter inoperative to exert spring pressure against said valve means during a portion of the movement of the latter in said opening direction and at the end of each cycle of operation of said machine, thereby rendering free the initial movement of said fluid power means and of said valve means in said opening direction.

5. A control mechanism for a machine having a fluid actuated clutch and brake in its driving train with dual valve means for operating the clutch and brake actuating elements, comprising manually actuated fluid power means for moving said valve means in opening direction, yieldable means urging said valve means in closing direction, and mechanical means independent of said fluid power means for moving said yieldable means a portion of the distance in said opening direction at the end of each cycle of operation of said machine, thereby rendering free the initial movement of said fluid power means and of said valve means in said opening direction and means for disconnecting said mechanical means from machine actuation whereby the movement of said valve means is controlled solely by said manually actuated power means.

6. A control mechanism for a machine having a fluid actuated clutch and brake in its driving train with dual valve means for operating the clutch and brake actuating elements, comprising manually actuated fluid power means for moving said valve means in opening direction, yieldable means for urging said valve means in closing direction, a machine operated cam and follower, one end of said follower being connected to said yieldable means to control the movement of the latter and means for rendering inoperative the movement of said cam and follower.

7. A control mechanism for a machine having a fluid actuated clutch and brake in its driving train with dual valve means for operating the clutch and brake actuating elements, comprising manually actuated fluid power means for moving said valve means in opening direction, yieldable means for moving said valve means in closing direction, a machine operated cam and follower, one end of said follower being connected to said yieldable means to control the movement of the latter, a portion of said cam being contoured so to move said follower and said yieldable means as to relieve the pressure of the latter from application to said valve means at the end of each cycle of operation of said machine and means for rendering inoperative the movement of said cam and said follower.

8. A control mechanism for a machine having a fluid actuated clutch and brake in its driving train with dual valve means for operating the clutch and brake actuating elements, comprising manually actuated fluid power means for moving said valve means in opening direction, spring means for moving said valve means in closing direction, mechanical means independent of said fluid power means for moving said spring means a portion of the distance in said one direction at the end of each cycle of operation of said machine, thereby rendering free the initial movement of said fluid power means and of said valve means in said opening direction and means for disconnecting said mechanical means from machine actuation, whereby the movement of said valve means is controllable solely by said manually actuated power means.

9. A control mechanism for a machine having a fluid actuated clutch and brake in its driving train with dual valve means for operating the clutch and brake actuating elements, comprising manually actuated fluid power means for moving said valve means in opening direction, a spring connected to said valve means for moving them in closing direction, a machine-operated cam a pivoted follower, said follower being connected to said spring and adapted normally to contact said cam, and a movable pivot for said follower for moving it out of contact with said cam.

10. A control mechanism for a machine having a fluid actuated clutch and brake in its driving train with dual valve means for operating the clutch and brake actuating elements, comprising manually actuated fluid power means for moving said valve means in opening direction, a spring connected to said valve means for moving them in closing direction, a machine-operated cam, a rocker arm follower, one end of said follower being connected to said spring and the other end of said follower normally contacting said cam, a portion of said cam being contoured so to move said follower and said spring as to relieve the application of spring pressure to said valve means at the end of each cycle of operation of said machine and a movable fulcrum for said follower for moving it out of contact with said cam.

WILLIAM W. CRILEY.